United States Patent [19]

Wilhelm

[11] Patent Number: 5,248,469
[45] Date of Patent: Sep. 28, 1993

[54] MECHANICAL REMOTE ROLL ADJUSTING APPARATUS AND METHOD FOR A PELLET MILL

[75] Inventor: Donald M. Wilhelm, Novato, Calif.

[73] Assignee: California Pellet Mill Company, San Francisco, Calif.

[21] Appl. No.: 963,174

[22] Filed: Oct. 19, 1992

[51] Int. Cl.⁵ .............................................. B29B 9/00
[52] U.S. Cl. ................................ 264/118; 264/141; 425/331; 425/DIG. 230
[58] Field of Search ................... 425/331, DIG. 230; 264/118, 140, 141

[56] References Cited

U.S. PATENT DOCUMENTS

| | | | |
|---|---|---|---|
| 3,280,426 | 10/1966 | Meakin | 425/314 |
| 3,354,845 | 11/1967 | Schultz | 425/331 |
| 3,467,031 | 9/1969 | Hafliger | 425/331 |
| 3,679,343 | 7/1972 | Gilman | 425/331 |
| 3,932,091 | 1/1976 | Vink | 425/331 |
| 3,981,664 | 9/1976 | Bittner et al. | 425/331 |
| 4,770,621 | 9/1988 | Groebli et al. | 425/150 |
| 4,838,779 | 6/1989 | Vries | 425/331 |

*Primary Examiner*—Mary Lynn Theisen
*Attorney, Agent, or Firm*—Robert F. Palermo

[57] ABSTRACT

An apparatus provides separate coarse rate and fine rate adjustability of spacing between extrusion rolls and a surrounding extrusion die in a pellet mill, including a roller tire, for each extrusion roll, mounted on bearings which are supported on a hollow shaft having a cylindrical eccentric bore; a solid axle shaft disposed within each hollow shaft and having eccentric bearing-journaled extensions and an axial length greater than that of the hollow shaft; a rigidly mounted front roller support plate having a bore for supporting said bearing-journaled eccentric extension at a front end of said solid axle shaft for each said roll, the bore being aligned with a matching bore for supporting a bearing-journaled eccentric extension at a rear end of each solid axle shaft for each said roll. Attached to each hollow shaft is a provision for rotating the hollow shaft to adjust a spacing distance between the roller tire and the extrusion die and for holding the shaft in a desired rotated position. The eccentric extensions of the solid roller shaft have a device, which can be located internally or externally to the mill, for rotating the solid shaft to adjust the spacing distance at a different rate than that produced by rotation of the hollow shaft.

18 Claims, 3 Drawing Sheets

MECHANICAL REMOTE ROLL ADJUSTING APPARATUS AND METHOD FOR A PELLET MILL

BACKGROUND OF THE INVENTION

This invention relates generally to feed processing equipment and more particularly to extrusion mills for pelletizing feed grains, formulas, and conditioned mixtures thereof.

Many feed compositions can be made into better quality pellets if more mechanical work is done to the feed on the face of the die before the feed is pressed through the pelleting holes of the die. Not only are the pellets produced under such conditions stronger, but they are also more thoroughly blended and conditioned as a result of the added mechanical work input.

One way of achieving this added work is to operate with a thick pad of feed between the die face and the rollers—usually one to three rollers per die. However, this condition can only be achieved if the rollers can be remotely adjusted while the mill is running and feed is being processed. Without such remote adjustment capability, the only way to operate with a thick pad of feed is to back-off the rolls, before starting the mill, to a gap which allows for the desired pad thickness and also accounts for thermal expansion during operation—a guess, at best. Still another reason for backing-off the rolls for mill start-up is to reduce the starting load on electric motor drives to extend motor life and to reduce power consumption. This would permit operation with smaller motors and lighter electrical service.

Early roller adjustments had to be made using a combination of jack screws, turnbuckles, and eccentrically mounted roller tires. For purposes of safety, these adjustments had to be made prior to starting the mill, and, since the rollers were not visible during operation, the adjustments had to be calculated and could not be verified when the mill was running. Also, starting the mill and the feed input with the rollers backed away from the die often resulted in development of an uneven pad and non-uniform pellet production.

To avoid these limitations, remote (external) roller adjustment systems have been developed with varying degrees of success in operation. The most common system uses single or double acting hydraulic cylinders in place of the jackscrews and turnbuckles to turn the eccentric shafts upon which the roller tires are mounted for adjustment. A single acting hydraulic cylinder can be monitored by measuring the volume of fluid going into or coming out of the cylinder to determine, ideally, the positions of the eccentric shafts. Leaks, however, can destroy the accuracy of such a method. Double acting cylinders can be used, but they take up more space and require more hydraulic lines. Generally they also require electronic position sensors within the mill which may fail due to the physically hostile environment.

At least one mechanical adjustment system employs disk cams mounted at the front and rear of the rollers, so that, when the cams are rotated, the cam action is applied to sliding blocks attached to the ends of the eccentric roller shafts. Cam position is controlled from outside the mill by means of a control shaft extending from the disk cams and having a "pointer" feature which can be used to indicate the size of the roller/die gap. The heavily loaded sliding blocks are precisely fitted in keyed ways which are subject to wear and corrosion and infiltration of feed material which may become compacted and cause jamming of the blocks. This may prevent roller adjustment and necessitate shut-down of the mill for cleaning and maintenance. Wear, on the other hand, may cause loosening of the blocks in the ways and permit roller shaking during operation. Such jamming and/or vibration can only be prevented by means of very complex sealing provisions for the blocks and ways. Because of the complexity of the sliding seals, deterioration may be rapid enough that the value of including such seals becomes marginal.

Existing cam type adjusters rely on springs to force the slide blocks against the cam surface. These springs have limited power and stroke. Thus, the slide blocks may not remain in contact with the cam, and, as a result, the rollers may not be backed off from the die and may become cocked.

Construction of mechanical adjustment systems must be very heavy and strong because of the high loading encountered when the rollers are moved outward toward the die while a feed material is being pelletized. As a result, space within the mill may become limited to an extent where the mill must be derated or remote roller adjustability may not be included.

The great diversity of animal foods and other feed materials available for pelletizing requires an adaptability of equal diversity from the pellet mill. In attempting to optimize the pelletizing operation for each of the diverse formulations encountered, a number of different operating conditions must be imposed. These difficulties, either alone or in combination and to varying degrees, are encountered in virtually every pelletizing operation because of variations in material properties, mill condition, and operating parameters.

The foregoing illustrates limitations known to exist in present feed extrusion pelleting mills. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by an apparatus for adjusting spacing between one or more extrusion rolls and a surrounding extrusion die, including a roller tire, for each extrusion roll, mounted on bearings which are supported on a hollow shaft having a cylindrical eccentric bore; a solid axle shaft disposed within each hollow shaft and having eccentric bearing-journaled extensions and an axial length greater than that of the hollow shaft; a rigidly mounted front roller support plate having a bore for supporting said bearing-journaled eccentric extension at a front end of said solid axle shaft for each said roll, the bore being aligned with a matching bore in a stationary roller support flange for supporting a bearing-journaled eccentric extension at a rear end of each solid axle shaft for each said roll. Attached to each hollow shaft is a provision for rotating the hollow shaft to adjust a spacing distance between the roller tire and the extrusion die. The eccentric extensions of the solid roller shaft are equipped with a device for rotating the solid shaft to also adjust the spacing distance.

The foregoing and other aspects will become apparent from the following detailed description of the inven-

BRIEF DESCRIPTION OF THE DRAWING FIGURES

DETAILED DESCRIPTION

Figure 1:
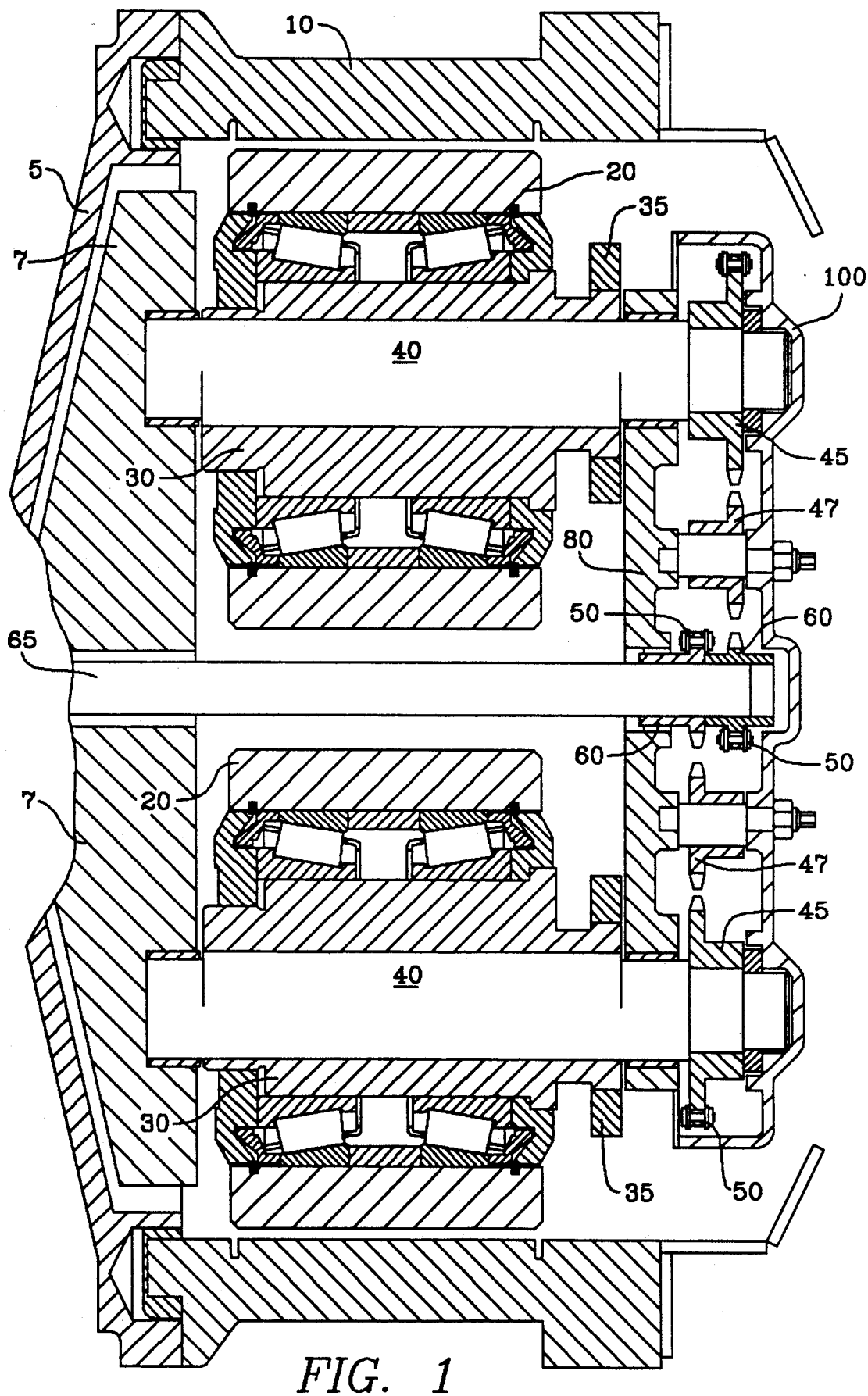
FIG. 1 is a partially sectional fragmentary plan view illustrating an embodiment of the roller adjustment device of the present invention in its operating environment within a pellet mill.

FIG. 1 shows a pelleting die 10 mounted on a rotatable quill flange 5 in a two roll pelleting mill. Stationary roller support flange 7 provides journaled support for the rear ends of solid axle shafts 40, upon which are mounted hollow shafts 30. Roller tires 20 are disposed on bearings which surround hollow shafts 30. Stationary front roller support plate 80 provides journaled support for the front ends of axle shafts 40 upon which are mounted sprockets 45 which are connected by chains 50 to adjusting drive sprocket 60. Control shaft 65 turns drive sprockets 60 thereby determining the rotary positions of axle shafts 40. Note that control shaft 65 is shown projecting into the mill from the rear, but it is possible and may be desirable to have it enter from the front in some cases. Idler sprockets 47, mounted on front roller support plate 80, maintain chain tension to discourage chain jumping, and a cover 100 protects the chain/sprocket mechanism.

Solid axle shafts 40 have their surfaces, upon which the bores of hollow shafts 30 are journaled, offset by approximately 3 to 6 millimeters eccentricity from the centerline axes of the eccentric journaled ends, or extensions, of solid shafts 40. Hollow shafts 30 have their outer surfaces, on which the bearings for roller tires 20 are mounted, offset by an eccentricity of approximately 16 to 24 millimeters from the bore in contact with axle shaft 40. Note that inner bores and outer surfaces are cylindrical for both axle shafts and hollow shafts but that the axes are displaced and parallel with respect to each other. Attached to hollow shaft 30 is adjuster lever 35 which, when moved, causes the roller tires 20 to approach or to withdraw from die 10 due to the eccentricity of hollow shaft 30. This movement is relatively rapid in that the large eccentricity provides a high ratio of tire 20 motion to adjuster lever 35 motion. The resulting low mechanical advantage requires heavy duty adjustment hardware for adjusting lever 35.

The eccentricities of the shafts 30 and 40 depends on the amount of rough and fine adjustment required and on the relative strengths of the turnbuckle 70/lever 35 and chain 50/sprocket 45 adjusting drive devices. Typically, the ranges are 5 to 50 millimeters for one and 1 to 10 millimeters for the other. However, for very large or very small mills, or for unusual applications in which the absolute adjustment magnitudes may be very large or very small, eccentricities may be required which are well outside these ranges. In some instances, it would even be desirable to assign the greater eccentricity to the solid shaft 40 and the lesser eccentricity to the hollow shaft 30 to facilitate assembly and operation.

Figure 2:
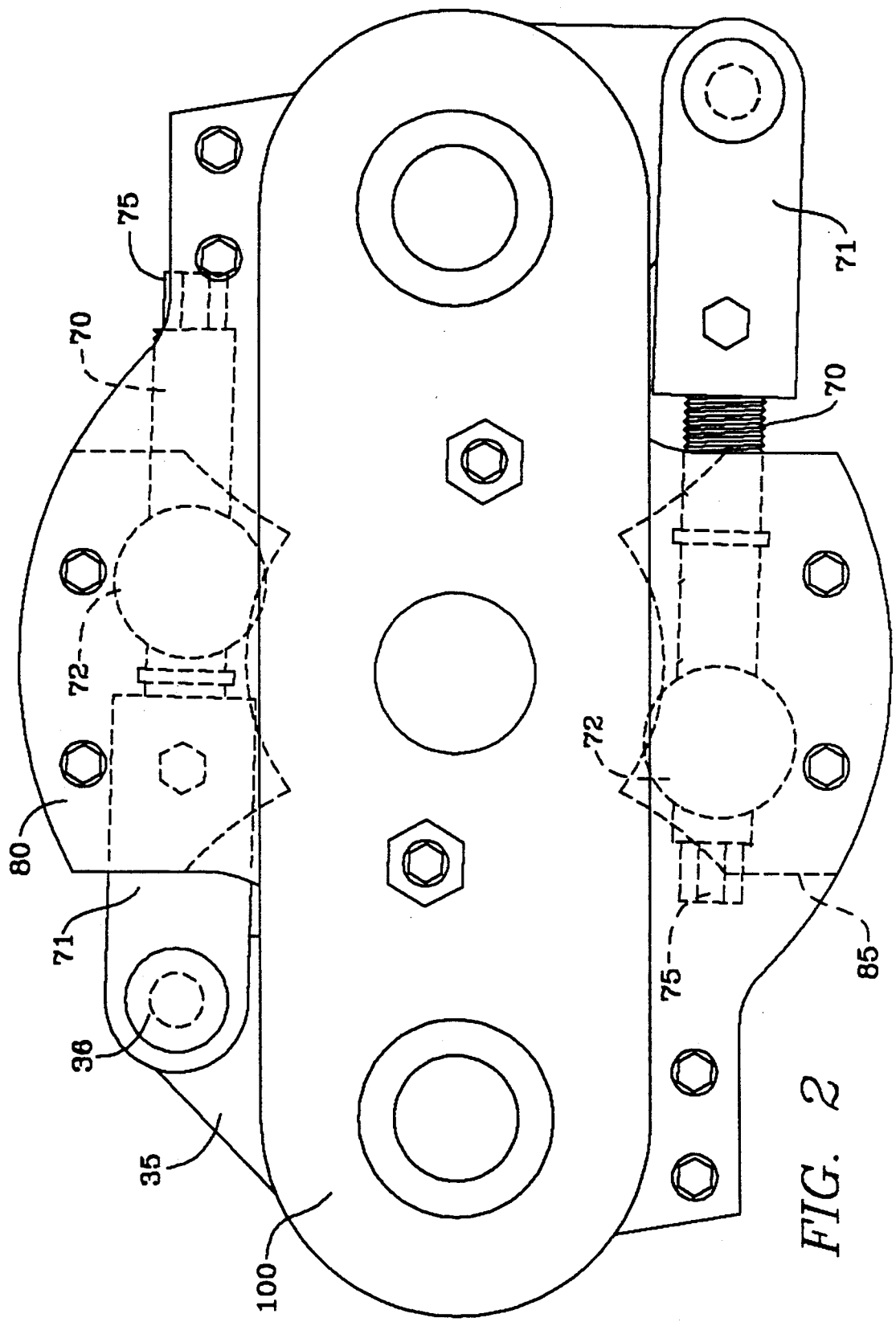
FIG. 2 is a fragmentary front elevation view of the front roller support to illustrate the jackscrews and turnbuckles used in the present invention only for roller coarse adjustment.

Referring to FIG. 2, the heavy duty adjustment hardware can be seen and understood. Adjuster levers 35 are connected, through pivot pin joints 36, to clevis 71 and to turnbuckles 70, which are anchored to jack points 72. Using turnbuckle adjusting nut 75, turnbuckle 70 may be lengthened or shortened in order to push clevis 71 and pivot pin joint 36 away from jack point 72 or vice versa. Movements of adjuster levers 35 produce the rapid, or coarse, roller adjustments described above. Jack points 72 are preferably fixed to front support plate 80, not shown, outside the chain and sprocket area defined by cover plate 100. The turnbuckle 70/adjuster lever 35 combination provides a very high strength roller adjustment capability together with a sufficient adjustment range to compensate for wear during operation.

Figure 3:
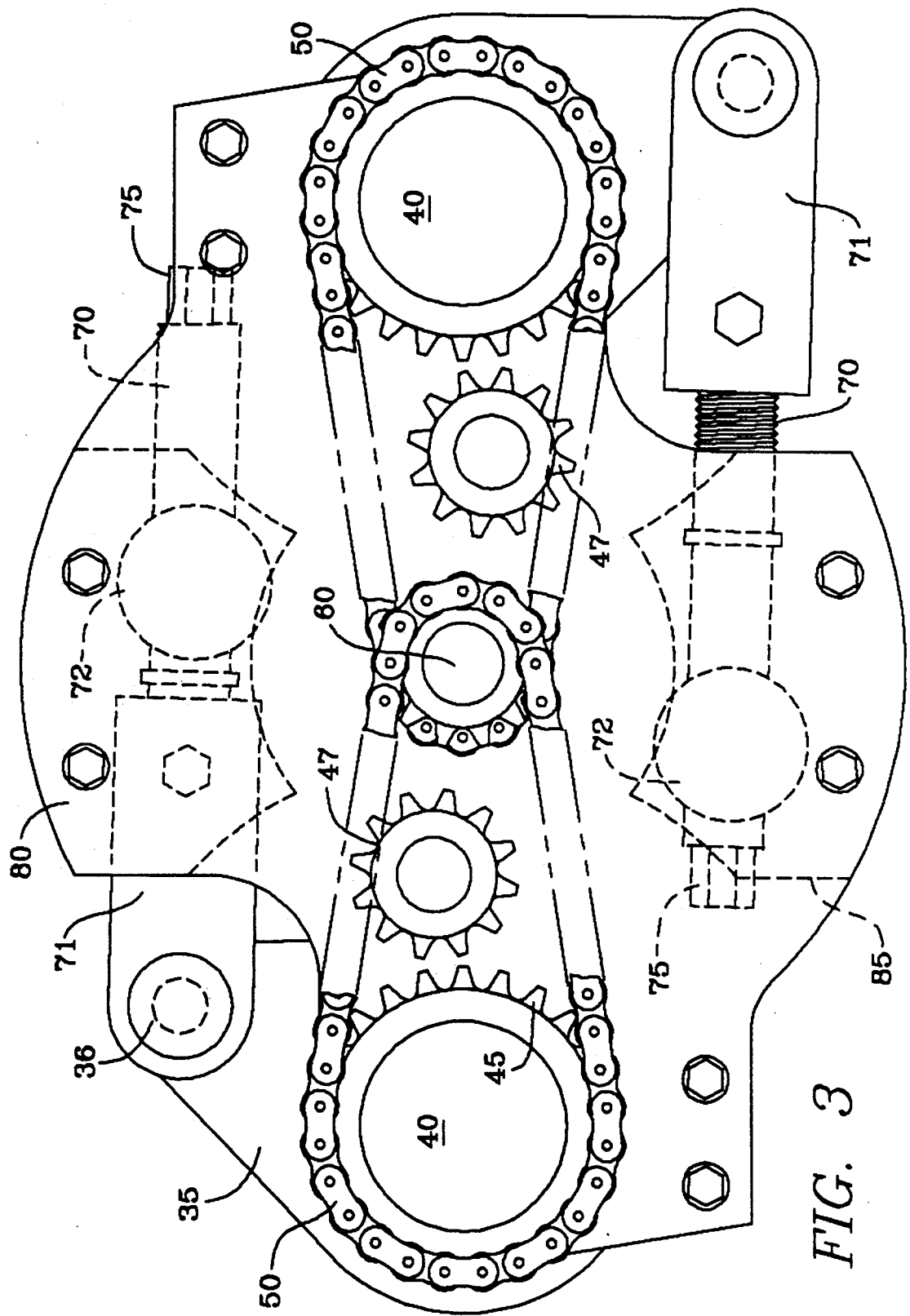
FIG. 3 is a view similar to that of FIG. 2 with the addition of the remotely operated roller fine adjustment feature of the present invention.

FIG. 3, taken together with FIGS. 1 & 2, illustrates some further structural details of the preferred embodiment of the invention. Support plate 80 is shown in elevation with plate support arms 85, shown in outline, having arcuate bevels at both edges to provide clearance for roller tires 20. Cantilevered support arms 85 project forward from stationary roller support flange 7 and provide rigid mounting for support plate 80. Only a portion of the full assembly is shown in FIG. 3 in order to avoid undue crowding and to still show representative portions of key elements of the invention. Jack point 72 projects forward from support plate 80. Turnbuckle 70 connects clevis 71 and pivot pin joint 36 of adjusting arm 35 with jack point 72 to provide a rigid coarse adjustment reference and mechanism. Fine adjustment is provided by adjusting chains 50 rotating sprockets 45 which are keyed or otherwise fixed to the ends of axle shafts 40. Idler sprockets 47 maintain proper chain tension during operation. Although the chain 50 and sprocket 45 fine adjustment mechanism shown is relatively weak compared to the turnbuckle 70 and adjuster lever 35 coarse adjustment combination, the favorable mechanical advantage provided by the approximately 3 millimeter eccentricity of axle shaft 40 enables it to function effectively.

In operation, the dual rate adjustment provisions of the present invention permits up to about 6 millimeters adjustment of rolls while the mill is running in addition to 32 millimeters adjustment during shut-down. This allows coarse direct roll adjustment to compensate for wear of the die and rolls and fine remote roll adjustment to permit "no load" start-up of the mill followed by fine adjustment of the rolls to accommodate a feed material pad of the desired thickness on the die.

Initially, the axle shaft 40 is positioned so the roller tires 20 are as close to the die 10 as possible. Then, turnbuckles 70 are used to turn hollow shafts 30 until the roller tires have the desired beginning operating clearance from the die 10. The axle shafts 40 are rotated 180 degrees to back-off the roller tires from the die by the full 6 millimeter capacity of the inner shaft. The mill is started under low torque conditions thereby avoiding significant wear and tear on the motor and power train. After the mill is started, but before feed material is added, the axle shafts are again turned 180 degrees to bring the roller tires back to the desired beginning operating clearance from the die.

Once feed material has been added and the rolls and die have reached operating temperature, the operator can begin to turn the control shaft 65 to rotate the axle shaft 40 and thus back-off the roller tires 20 to create a thicker pad of feed material on the die. This increases the amount of work put into the feed on the die and, thereby, improves feed conditioning and pellet quality.

Some advantages of this design include the safety factor introduced by positioning the rolls as close to the die as possible using the outer shafts while the inner shafts are oriented with their eccentrics at the maximum outward roll position. Thus, after the low torque start with the axle shafts rotated to back-off the rolls, there is no danger of bringing the rolls too close to the die when the operator readjusts them, since the desired clearance was established with the fine eccentricity at the maximum position. Also, there is a significant reduction of loads on the remote roll adjustment mechanism due to the large mechanical advantage attributable to the 3 millimeter axle shaft eccentricity which provides the roll adjustment when the shafts are turned using the remote adjustment feature. This permits design of the remote adjusting system using relatively small lightweight components such as chain or worm gear drives. Only by having separate coarse and fine adjustment capability is it practical to limit the remote adjustment to a maximum of 6 millimeters and to thereby reap the benefits of the resulting increase in mechanical advantage. The coarse 32 millimeter adjustment is needed to compensate, during the life of the mill, for wear of the die and rolls when establishing roll-to-die clearance prior to start-up of the mill.

What is claimed is:

1. An apparatus for adjusting spacing between one or more extrusion rolls and a surrounding extrusion die in a pellet mill, comprising:
   a roller tire, for each said extrusion roll, mounted on bearings which are supported on a hollow shaft having a cylindrical eccentric bore;
   a solid axle shaft, disposed within each said hollow shaft, and having bearing-journaled eccentric extensions and an axial length greater than that of said hollow shaft;
   a rigidly mounted front roller support plate having a bore for supporting said bearing-journaled eccentric extension at a front end of said solid axle shaft for each said roll, said bore being aligned with a matching bore in a stationary roll support flange for supporting a bearing-journaled eccentric extension at a rear end of said solid axle shaft for each said roll;
   means, attached to each said hollow shaft, for rotating said hollow shaft to adjust a spacing distance between said roller tire and said extrusion die; and
   means, attached to said eccentric extension, for rotating said solid axle shaft to adjust said spacing distance between said roller tire and said extrusion die.

2. The apparatus of claim 1, further comprising:
   means for holding said shafts in desired rotated positions.

3. The apparatus of claim 1, further comprising:
   means, extending outside of the pellet mill, for operating the means for rotating said hollow shaft.

4. The apparatus of claim 1, further comprising:
   means, extending outside of the pellet mill, for operating the means for rotating said solid axle shaft.

5. The apparatus of claim 1, wherein the means for rotating said hollow shaft comprises an adjusting lever on each said hollow shaft, said lever being adjusted and held in position by a turnbuckle attached to a jacking point on a stationary roll support.

6. The apparatus of claim 1, wherein the means for rotating said solid axle shaft comprises a sprocket and chain arrangement for each said solid axle shaft.

7. The apparatus of claim 1, wherein the means for rotating said solid axle shaft comprises a worm gear and a screw arrangement for each said solid axle shaft.

8. The apparatus of claim 1, wherein said hollow shaft and said solid axle shaft have differing degrees of eccentricity.

9. The apparatus of claim 8, wherein the eccentricity of said hollow shaft is between 5 millimeters and 50 millimeters while that of said solid axle shaft is between 1 millimeter and 10 millimeters.

10. The apparatus of claim 8, wherein the eccentricity of said solid axle shaft is between 5 millimeters and 50 millimeters while that of said hollow shaft is between 1 millimeter and 10 millimeters.

11. In a pellet mill of the type having a cylindrical extrusion die mounted on a rotatable quill shaft; one or more extrusion rolls mounted within said die, each said roll having a tire which bears against a surface of said die and extrudes feed materials through perforations of the die, the improvement providing remote adjustability of spacing between said rolls and said die, comprising:
   a solid axle shaft for each extrusion roll, said axle shaft having eccentric cylindrical ends which are journaled in bores in stationary roll supports;
   a hollow shaft mounted upon each said solid shaft, said hollow shaft having a cylindrical bore eccentrically located but parallel with respect to a cylindrical outer surface upon which are mounted bearings which support a roller tire for each said extrusion roll;
   means, attached to each said hollow shaft, for rotating said hollow shaft to adjust a spacing distance between said roller tire and said extrusion die; and
   means, attached to said eccentric cylindrical end, for rotating said solid axle shaft to adjust said spacing distance.

12. The apparatus of claim 11, further comprising:
   means, extending outside of the pellet mill, for operating the means for rotating said solid axle shaft.

13. The apparatus of claim 11, wherein the means for rotating said hollow shaft comprises an adjusting lever on each said hollow shaft, said lever being adjusted and held in position by a turnbuckle attached to a jacking point on a stationary roll support.

14. The apparatus of claim 11, wherein the means for rotating said solid axle shaft comprises a sprocket and chain arrangement for each said solid axle shaft.

15. The apparatus of claim 11, wherein said hollow shaft and said solid axle shaft have differing degrees of eccentricity.

16. The apparatus of claim 15, wherein the eccentricity of said hollow shaft is between 5 millimeters and 50 millimeters while that of said solid axle shaft is between 1 millimeter and 10 millimeters.

17. A method for remotely adjusting a spacing distance between a die and extrusion rolls for a pellet mill, comprising the steps of:
   provide a roller tire, for each roll, mounted on bearings on a cylindrical outer surface of a hollow shaft, said outer surface being eccentric with respect to a parallel cylindrical bore of said hollow shaft;
   provide a solid axle shaft, for each hollow shaft, having eccentric cylindrical ends journaled in bores provided in stationary roll supports;

provide means for rotating said hollow shaft to adjust the spacing distance between the die and the rolls;

provide means for rotating said solid axle shaft independently of said hollow shaft to adjust the spacing distance between the die and the rolls;

provide means, outside the pellet mill, for operating one or the other of said means for rotating said hollow shaft or said solid axle shaft;

using said means for rotating said hollow shaft, rotate said hollow shaft to position said rolls at their maximum outward locations;

using said means for rotating said solid axle shaft, position said rolls in contact with said die;

rotate said hollow shaft to position said rolls at their minimum outward locations;

start the pellet mill under no load conditions; and using the means provided outside the pellet mill, rotate said hollow shaft to position said rolls at the desired spacing distance from the die for operation.

18. The method of claim 17, wherein the means for rotating said hollow shaft and the means for rotating said solid shaft provide different rates of adjustment of said spacing distance for the same rates of shaft rotation.

* * * * *